United States Patent
Neubauer et al.

(10) Patent No.: US 10,708,878 B2
(45) Date of Patent: Jul. 7, 2020

(54) SUPPORTING A SECURE TERRESTRIAL TRANSMITTER BASED POSITIONING

(71) Applicant: HERE Global B.V., Eindhoven (NL)

(72) Inventors: Nicolas Neubauer, Berlin (DE); David Falla Cepeda, Berlin (DE)

(73) Assignee: HERE Global B.V., Eindhoven (NL)

(*) Notice: Subject to any disclaimer, the term of this patent is extended or adjusted under 35 U.S.C. 154(b) by 0 days.

(21) Appl. No.: 16/502,589

(22) Filed: Jul. 3, 2019

(65) Prior Publication Data

US 2019/0327705 A1    Oct. 24, 2019

Related U.S. Application Data

(62) Division of application No. 15/681,532, filed on Aug. 21, 2017, now Pat. No. 10,405,292.

(51) Int. Cl.
    *H04W 64/00*   (2009.01)
    *H04B 17/318*  (2015.01)

(52) U.S. Cl.
    CPC .......... *H04W 64/00* (2013.01); *H04B 17/318* (2015.01)

(58) Field of Classification Search
    CPC .... H04W 12/10; H04W 64/00; H04B 17/318; H04L 63/123
    USPC ......... 455/456.1, 456.2, 456.3, 115.1, 115.3, 455/161.1, 161.3, 513
    See application file for complete search history.

(56) References Cited

U.S. PATENT DOCUMENTS

| | | |
|---|---|---|
| 7,885,639 B1 | 2/2011 | Satish et al. |
| 9,282,435 B2 | 3/2016 | Ward et al. |
| 2005/0268107 A1 | 12/2005 | Harris et al. |
| 2008/0252517 A1* | 10/2008 | Fuchs .................. G01S 5/0036 342/357.66 |

(Continued)

FOREIGN PATENT DOCUMENTS

WO    2016048578 A2    3/2016

OTHER PUBLICATIONS

"Beacon Frame." Feb. 10, 2017. In Wikipedia, The Free Encyclopedia. Retrieved Aug. 16, 2017, from https://en.wikipedia.org/w/index.php?title=Beacon_frame&oldid=764750885.

(Continued)

*Primary Examiner* — Congvan Tran
(74) *Attorney, Agent, or Firm* — Lempia Summerfield Katz LLC

(57) ABSTRACT

A device with transmitter broadcasts packets including a transmitter identifier via a radio interface with varying timings of transmissions. It determines a current timing of transmissions based on clock signals and a secret code, using a cryptographic function. A mobile device detects radio signals conveying such packets and performs measurements on the signals. It determines a currently used timing of transmissions, assembles a positioning request including the transmitter identifier, results of the measurements and an indication of the timing of transmissions, and transmits the request. A server receives the request. It generates for the transmitter an expected timing of transmissions using a cryptographic function, based on a signal of a master clock and based on a stored secret code assigned to the transmitter. It provides position information as trusted position information only in the case of a match between the indicated and the expected timing of transmissions.

19 Claims, 7 Drawing Sheets

(56) References Cited

U.S. PATENT DOCUMENTS

| | | | | |
|---|---|---|---|---|
| 2010/0245050 | A1* | 9/2010 | Shiotsu | G01S 5/04 |
| | | | | 340/10.3 |
| 2013/0203437 | A1* | 8/2013 | Whelan | G01S 19/05 |
| | | | | 455/456.1 |
| 2014/0220883 | A1 | 8/2014 | Emigh et al. | |
| 2015/0078250 | A1* | 3/2015 | Mineta | H04J 13/10 |
| | | | | 370/320 |
| 2015/0312840 | A1* | 10/2015 | Kazmi | H04W 40/244 |
| | | | | 455/456.2 |
| 2016/0156638 | A1 | 6/2016 | Somani et al. | |
| 2016/0249268 | A1* | 8/2016 | Usui | H04W 16/32 |
| 2017/0181188 | A1* | 6/2017 | Brisebois | H04W 16/28 |
| 2017/0317807 | A1* | 11/2017 | Abdelmonem | H04B 17/00 |
| 2017/0339608 | A1* | 11/2017 | Cui | H04B 17/318 |
| 2018/0049079 | A1* | 2/2018 | Ozturk | H04W 28/16 |
| 2018/0139691 | A1* | 5/2018 | Onishi | H04W 36/14 |
| 2018/0191398 | A1* | 7/2018 | Kobayashi | H04B 1/04 |

OTHER PUBLICATIONS

"RSA SecurID." Aug. 10, 2017. In Wikipedia, The Free Encyclopedia. Retrieved Aug. 15, 2017, from https://en.wikipedia.org/w/index.php?title=RSA_SecurID&oldid=794845428.

Biehl, Jacob, et al."You're Where? Prove It! Towards Trusted Indoor Location Estimation of Mobile Devices." UbiComp'15. Sep. 7-11, 2015. (pp. 1-11).

Cho, Junsung, et al. "Wrong Siren! A Location Spoofing Attack on Indoor Positioning Systems: The Starbucks Case Study." IEEE Communications Magazine. Mar. 2017. (pp. 2-6).

* cited by examiner

SUPPORTING A SECURE TERRESTRIAL TRANSMITTER BASED POSITIONING

CROSS-REFERENCE TO RELATED APPLICATIONS

This application is a divisional under 35 U.S.C. § 121 and 37 C.F.R. § 1.53(b) of U.S. patent application Ser. No. 15/681,532 filed Aug. 21, 2017, the disclosure of which is incorporated herein by reference in its entirety.

FIELD OF THE DISCLOSURE

The disclosure relates to the field of positioning and more specifically to supporting a secure positioning that is based on signals of terrestrial transmitters.

BACKGROUND

Using measurements on signals of terrestrial transmitters for positioning purposes may be of particular interest at indoor locations, where satellite signals for a satellite signal based positioning may not be available or not be available with sufficient signal strength.

The terrestrial transmitters may belong for instance to access points of wireless local area networks (WLAN), to Bluetooth® (BT) devices or to Bluetooth low energy (BLE) beacons. Such transmitters broadcast standard signals in order to advertise their presence. In some cases, they may advertise in this way availability to mobile devices seeking a connection. The signals may convey information in the form of packets of predefined format, and the information may include at least an identifier of the transmitter. The transmitters may be visible to any mobile device with suitable radio interface, regardless of whether or not they are known to the mobile device. The broadcast signals are equally referred to as beacons.

A terrestrial transmitter based positioning at a particular site may be based on radio maps, which allow determining for instance which received signal strengths of which transmitters can be expected at various locations of the particular site.

For making use of a positioning service, a mobile client device may detect signals broadcast by a plurality of transmitters and measure their signal strengths. The mobile device may send results of the measurements along with identifiers of the transmitters to a positioning server.

An identifier may be for instance in the form of a service set identifier (SSID) and the results of measurements may be for instance in the form of a received signal strength indicator (RSSI). The positioning server may evaluate the signals taking account of data stored in radio maps and return coordinates that are consistent with the measured signal strengths of the plurality of transmitters.

SUMMARY OF SOME EMBODIMENTS OF THE INVENTION

An example embodiment of a method according to a first aspect comprises, performed by at least one apparatus, receiving a positioning request from a mobile device, the positioning request including: an identifier of a transmitter, an indication of a timing of transmissions currently used by the transmitter for broadcasting packets and a result of measurements by the mobile device on radio signals of the transmitter conveying the packets. The method further comprises generating for the transmitter at least one expected timing of transmissions using a cryptographic function, based on a signal of a master clock and based on a secret code assigned to the transmitter, wherein the at least one apparatus has access to a plurality of stored secret codes assigned to a plurality of transmitters. The method further comprises determining whether there is a match between the indicated timing of transmissions and the at least one expected timing of transmissions. The method further comprises providing position information as certified position information only in the case of a match, wherein the position information is determined based on the results of measurements in the positioning request.

An example embodiment of a first system according to the first aspect comprises means for causing performance of the actions of any embodiment of the method presented for the first aspect. The means may be distributed to one or more devices.

The means of the system may be implemented in hardware and/or software. They may comprise for instance a processor for executing computer program code for realizing the required functions, a memory storing the program code, or both. Alternatively, they may comprise for instance circuitry that is designed to realize the required functions, for instance implemented in a chipset or a chip, like an integrated circuit.

An example embodiment of a second system according to the first aspect comprises at least one processor and at least one memory including computer program code, the at least one memory and the computer program code configured to, with the at least one processor, cause at least one apparatus at least to perform the actions of any embodiment of the presented method according to the first aspect. The at least one processor and/or the at least one memory may belong to a single device or be distributed to several devices.

Any of the described systems may comprise only the indicated components or one or more additional components, like a data interface or a memory with database. Any of the described systems may be a device, be a part of a device or be composed of a plurality of devices.

An example embodiment of a method according to a second aspect comprises, performed by a mobile device, detecting radio signals used by at least one transmitter for broadcasting packets and performing measurements on the detected radio signals. The method further comprises extracting identifiers of transmitters from the packets. The method further comprises determining, based on the detected radio signals, a timing of transmissions currently used by each of the at least one transmitter for broadcasting packets, wherein the timing of transmissions is based on a secret code assigned to the at least one transmitter and on signals of a clock that is synchronized with a master clock. The method further comprises assembling a positioning request including for each of the at least one transmitter at least: an identifier of the transmitter, results of measurements on the detected radio signals and an indication of the determined timing of transmissions. The method further comprises causing transmission of the positioning request to a server.

An example embodiment of a first apparatus according to the second aspect comprises means for causing performance of the actions of any embodiment of the method presented for the second aspect.

The means of the apparatus may be implemented in hardware and/or software. They may comprise for instance a processor for executing computer program code for realizing the required functions, a memory storing the program code, or both. Alternatively, they may comprise for instance circuitry that is designed to realize the required functions, for instance implemented in a chipset or a chip, like an integrated circuit.

An example embodiment of a second apparatus according to the second comprises at least one processor and at least one memory including computer program code, the at least one memory and the computer program code configured to, with the at least one processor, cause a mobile device at least to perform the actions of any embodiment of the presented method according to the second aspect.

An example embodiment of a method according to a third aspect comprises, performed by a device comprising a transmitter, determining in regular intervals a currently to be used timing of transmissions based on signals of a clock of the device, which has been synchronized with a master clock, based on a secret code assigned to the transmitter, and using a cryptographic function. The method further comprises causing a broadcast of packets via a radio interface with the currently to be used timing of transmissions, each packet including at least an identifier of the transmitter.

An example embodiment of a first apparatus according to the third aspect comprises means for causing performance of the actions of any embodiment of the method presented for the third aspect.

The means of the apparatus may be implemented in hardware and/or software. They may comprise for instance a processor for executing computer program code for realizing the required functions, a memory storing the program code, or both. Alternatively, they may comprise for instance circuitry that is designed to realize the required functions, for instance implemented in a chipset or a chip, like an integrated circuit.

An example embodiment of a second apparatus according to the third comprises at least one processor and at least one memory including computer program code, the at least one memory and the computer program code configured to, with the at least one processor, cause a device comprising a transmitter at least to perform the actions of any embodiment of the presented method according to the third aspect.

Any of the described apparatuses may comprise only the indicated components or one or more additional components, like a radio interface, a user interface, etc.

Moreover an example embodiment of a non-transitory computer readable storage medium, in which computer program code is stored, is presented for the first, second and third aspect, respectively. For the first aspect, the computer program code causes at least one apparatus to perform the actions of any embodiment of the presented method of the first aspect when executed by at least one processor. For the second aspect, the computer program code causes a mobile device to perform the actions of any embodiment of the presented method of the second aspect when executed by at least one processor. For the third aspect, the computer program code causes a device comprising a transmitter to perform the actions of any embodiment of the presented method of the third aspect when executed by at least one processor.

In either case, the computer readable storage medium may be for example a disk or a memory or the like. The computer program code may be stored in the computer readable storage medium in the form of instructions encoding the computer-readable storage medium. The computer readable storage medium may be intended for taking part in the operation of a device, like an internal or external hard disk of a computer or like an integrated or exchangeable memory card, or it may be intended for distribution of the program code, like an optical disc or memory stick or memory card.

It is to be understood that any embodiment of the computer program code by itself has to be considered an example embodiment according to the first, second or third aspect as well. The computer program code could also be distributed in each case to several computer readable storage mediums.

In certain embodiments, any of the presented methods is an information providing method, and any of the presented first systems is an information providing system and any of the presented first apparatuses is an information providing apparatus. In certain embodiments, the means of the presented first system and/or of the first apparatus are processing means.

In certain embodiments, any of the presented methods is a method for supporting a secure terrestrial transmitter based positioning. In certain embodiment, any of the presented systems is a system for supporting a secure terrestrial transmitter based positioning. In certain embodiment, any of the presented apparatuses is an apparatus for supporting a secure terrestrial transmitter based positioning.

It is to be understood that any feature presented for a particular example embodiment may also be used in combination with any other described example embodiment of any category and any aspect.

Further, it is to be understood that the presentation in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

Figure 1:
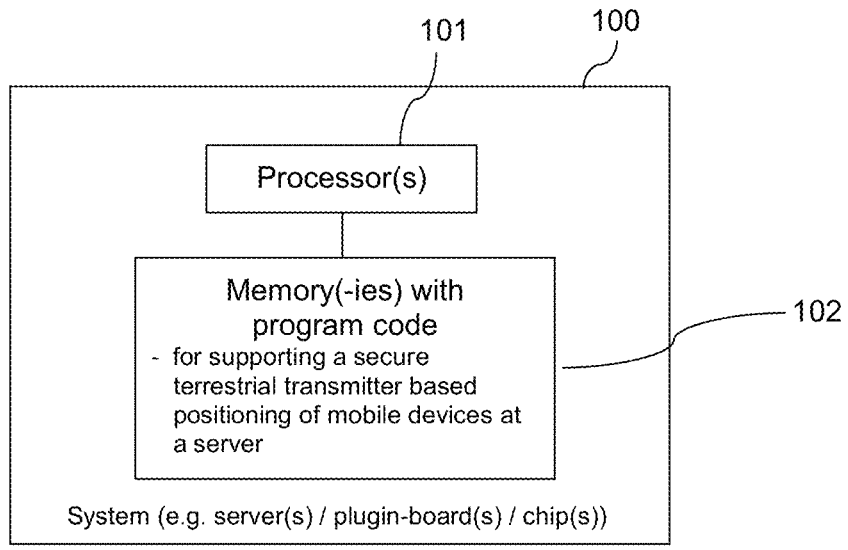
FIG. 1 is a schematic block diagram of an example embodiment of a system according to the first aspect.

FIG. 1 is a schematic block diagram of an example embodiment of a system 100 according to the first aspect.

System 100 comprises at least one processor 101 and, linked to the at least one processor 101, at least one memory 102. The at least one memory 102 stores computer program code for supporting a secure terrestrial transmitter based positioning of mobile devices at a server. The computer program code may be example computer program code according to the first aspect, and the at least one memory 102 may be an example computer readable medium according to the first aspect. The at least one processor 101 is configured to execute computer program code stored in the at least one memory 102 in order to cause at least one apparatus to perform desired actions.

System 100 may be a device, like a computer or server, or a combination of devices, like computers/servers in the Cloud. System 100 may equally be a module, like a chip, circuitry on a chip or a plug-in board, for a device. System 100 may comprise various other, optional components, for instance a clock, a data memory and/or data interfaces. The at least one processor 101 may optionally be linked to one or more of such additional components.

An example operation of system 100 will now be described with reference to the flow chart of FIG. 2. The operation is an example embodiment of a method according to the first aspect. The at least one processor 101 and the program code stored in the at least one memory 102 cause at least one apparatus to perform the operation when program code is retrieved from the at least one memory 102 and executed by the at least one processor 101. It is to be understood that the at least one processor 101 may comprise or have access to at least one working memory for this purpose, for example in the form of a random access memory (not shown). The at least one apparatus that is caused to perform the operation may be or belong to system 100, or comprise system 100.

The at least one apparatus receives a positioning request from a mobile device. The positioning request includes: an identifier of a transmitter, an indication of a timing of transmissions currently used by the transmitter for broadcasting packets and a result of measurements by the mobile device on radio signals of the transmitter conveying the packets. (action 201) The transmitter may belong for example to any device that is operated at a fixed, registered location. It is to be understood that the positioning request may comprise further data relating to the transmitter. It is to be understood that the positioning request may comprise corresponding data for more than one transmitter. The packets may be for instance in the form of beacon frames as defined in IEEE 802.11, or in any other form as long as they comprise the indicated information. The result of measurements may comprise for instance an indication of a received signal strength or a path loss value or a time of transmission, etc.

The at least one apparatus generates for the transmitter at least one expected timing of transmissions using a cryptographic function, based on a signal of a master clock and based on a secret code assigned to the transmitter, wherein the at least one apparatus has access to a plurality of stored secret codes assigned to a plurality of transmitters. (action 202) The signal of the master clock and the secret code may be input values to the cryptographic function. A timing of transmissions may indicate for instance the interval in which transmissions take place, for example every 0.1 second or every 0.2 second, etc. Other time units than seconds could be used as well. Such a timing of transmissions may also be referred to as cycle time. Alternatively, a timing of transmissions may indicate for instance a frequency, for example 10 times per second, etc.

The at least one apparatus determines whether there is a match between the indicated timing of transmissions and the at least one expected timing of transmissions. (action 203)

The at least one apparatus provides requested position information as certified position information only in the case of a match. The position information is determined in this case based on the results of measurements in the positioning request. (action 204) It is to be understood that various further conditions may have to be met for determining the requested position information. The at least one apparatus may generally provide position information only in the case of a match. In this case, any position information provided by the at least one apparatus is known to be considered valid by the at least one apparatus. At least if, for some reason, position information is to be provided as well in case there is no match, additional measures may be taken to indicate position information as certified position information in the case of a match.

Figure 3:
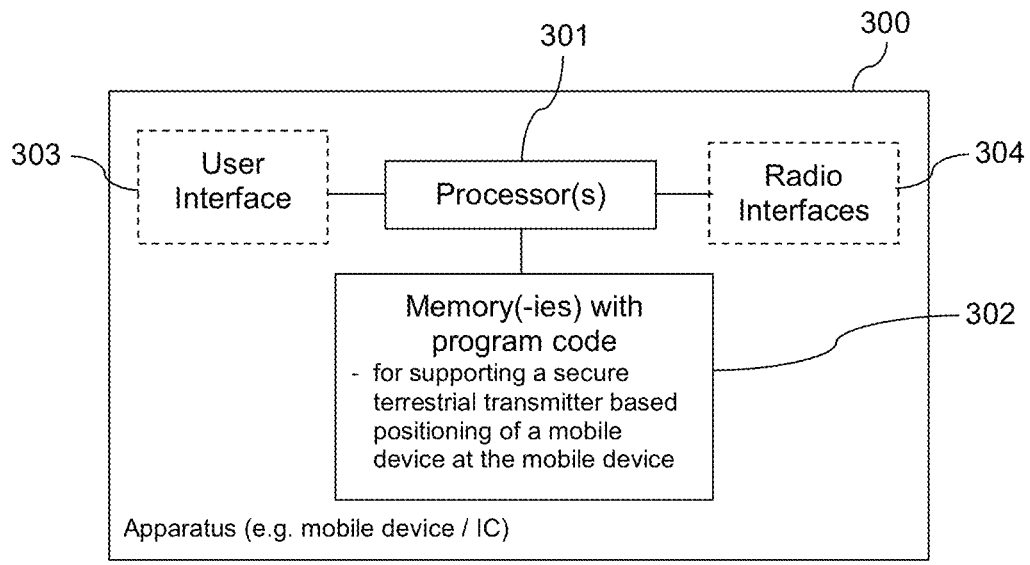
FIG. 3 is a schematic block diagram of an example embodiment of an apparatus according to the second aspect.

FIG. 3 is a schematic block diagram of an example embodiment of an apparatus 300 according to the second aspect. Apparatus 300 comprises at least one processor 301 and, linked to the at least one processor 301, at least one memory 302. The at least one memory 302 stores computer program code for supporting a secure terrestrial transmitter based positioning of a mobile device at the mobile device. The computer program code may be example computer program code according to the second aspect, and the at least one memory 302 may be an example computer readable medium according to the second aspect. The at least one processor 301 is configured to execute computer program code stored in the at least one memory 302 in order to cause a device to perform desired actions.

Apparatus 300 may be any kind of mobile device, like a handheld mobile user device or an Internet-of-things (IoT) device. Apparatus 300 may equally be a module, like a chip, circuitry on a chip or an integrated circuit, for a mobile device. Apparatus 300 may comprise various other, optional components, for instance a user interface 303 and/or radio interfaces 304. The at least one processor 301 may optionally be linked to one or more of such additional components.

An example operation of apparatus 300 will now be described with reference to the flow chart of FIG. 4. The operation is an example embodiment of a method according to the second aspect. The at least one processor 301 and the program code stored in the at least one memory 302 cause a mobile device to perform the operation when program code is retrieved from the at least one memory 302 and executed by the at least one processor 301. It is to be understood that the at least one processor 301 may comprise or have access to a working memory for this purpose, for example in the form of a random access memory (not shown). The mobile device that is caused to perform the operation may be or comprise apparatus 300. The mobile device may be for instance the mobile device mentioned with reference to FIG. 2.

The mobile device detects radio signals used by at least one transmitter for broadcasting packets and performs measurements on the detected radio signals. (action 401)

The mobile device extracts identifiers of transmitters from the packets. (action 402)

The mobile device determines, based on the detected radio signals, a timing of transmissions currently used by each of the at least one transmitter for broadcasting packets, wherein the timing of transmissions is based on a secret code assigned to the at least one transmitter and on signals of a clock that is synchronized with a master clock. (action 403)

The mobile device assembles a positioning request including for each of the at least one transmitter at least: an identifier of the transmitter, results of measurements on the detected radio signals and an indication of the determined timing of transmissions. (action 404)

The mobile device causes transmission of the positioning request to a server. (action 405) The server may comprise, be or belong to the at least one apparatus mentioned with reference to FIG. 2.

Figure 5:
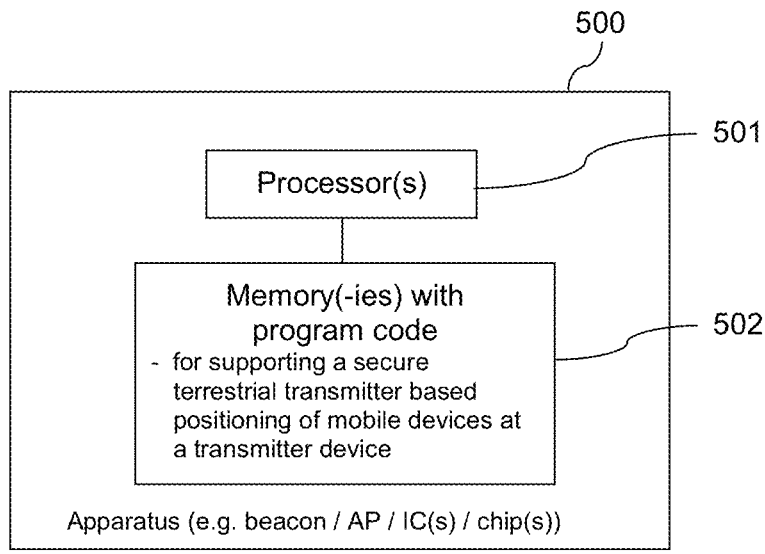
FIG. 5 is a schematic block diagram of an example embodiment of an apparatus according to the third aspect.

FIG. 5 is a schematic block diagram of an example embodiment of an apparatus 300 according to the third aspect. Apparatus 500 comprises at least one processor 501 and, linked to the at least one processor 501, at least one memory 502. The at least one memory 502 stores computer program code for supporting a secure terrestrial transmitter based positioning of mobile devices at a transmitter device. The computer program code may be example computer program code according to the third aspect, and the at least one memory 502 may be an example computer readable medium according to the third aspect. The at least one processor 501 is configured to execute computer program code stored in the at least one memory 502 in order to cause a device to perform desired actions.

Apparatus 500 may be a stationary device comprising a transmitter, like a Bluetooth device, a BLE device or a WLAN AP. It may have only transmitting capabilities, which reduces complexity and increases security. However, it may also have transmitting and receiving capabilities, like a fully capable network access point, which may allow using it as multi-purpose device. The device may be stationary in that it is placed and operated at a certain registered location. Apparatus 500 may equally be a module, like a chip, circuitry on a chip or an integrated circuit, for a device comprising a transmitter. Apparatus 500 may optionally comprise one or more other components, like a transmitter or transceiver, a clock, input ports, a battery or a line connector, etc. The at least one processor 500 may optionally be linked to one or more of such additional components.

An example operation of apparatus 500 will now be described with reference to the flow chart of FIG. 6. The operation is an example embodiment of a method according to the third aspect. The at least one processor 501 and the program code stored in the at least one memory 502 cause a device comprising a transmitter to perform the operation when program code is retrieved from the at least one memory 502 and executed by the at least one processor 501. It is to be understood that the at least one processor 501 may comprise or have access to a working memory for this purpose, for example in the form of a random access memory (not shown). The device that is caused to perform the operation may be or belong to apparatus 500, or comprise apparatus 500. The device may be for instance a device comprising the transmitter mentioned with reference to FIG. 2 or FIG. 4.

The device determines in regular intervals a currently to be used timing of transmissions based on signals of a clock of the device, which has been synchronized with a master clock, based on a secret code assigned to the transmitter, and using a cryptographic function. (action 601) The signals of the clock and the secret code may be input values for the cryptographic function.

The device causes a broadcast of packets via a radio interface with the currently to be used timing of transmissions, each packet including at least an identifier of the transmitter. (action 602) The packets are thus conveyed by radio signals.

The invention is based on the consideration that some services require a user of a mobile device to be located at a particular location, for instance in a particular room, in order to be allowed to make use of a particular service. Thus, providing the service may be based on a positioning of the mobile device. It may therefore become important to provide mechanisms that avoid a tampering or spoofing of positioning data by malicious users. If the signal strengths of signals of terrestrial transmitters are used to determine a position of the mobile device, a malicious user could simply record measured signal strengths at a desired location, at which a service is available, and subsequently send the recorded data to a positioning service from some other location. A positioning server receiving this data may unsuspectingly return the position that matches the signal strengths, without any certainty of authenticity of the location of the mobile device. Certain venues, like offices or banks, etc., may benefit from offering a more secure and confirmed positioning, which reduces the possibilities of tampering with data about signals.

Certain embodiments therefore provide that transmitter devices are configured to transmit packets including a transmitter identifier with pseudo-randomly changing frequency. The respective timing of transmissions may be determined by means of a cryptographic function based on a secret code and a clock signal. The secret code may be transmitter specific and only known to the transmitter and a positioning server. A clock providing the clock signal may have been synchronized with a master clock of the positioning server. Mobile devices may determine the respective timing of transmissions of packets when performing measurements on signals of the transmitter devices, and include corresponding information in a positioning request to the positioning server, along with results of the measurements. The positioning server only determines and provides a position estimate for the mobile device based on results of the measurements on signals, in case the indicated timing of transmissions corresponds to an expected timing of transmissions. The expected timing of transmissions is determined using the same cryptographic function, the same secret code and a time signal of the master clock.

Certain embodiments may have the effect that they introduce a secure variable to the terrestrial transmitter based positioning concept. They may provide a reliable indication that a mobile device is indeed at a position defined by the provided results of measurements. Other than static auxiliary readings at a certain position, which could be recorded and used in a positioning request at some other location to fool the system, the presented approach prevents the usability of recordings due to the time factor that is encrypted with a secret code known to server and transmitter device only. Integration of the presented approach with current radio map and positioning server mechanisms is possible using an extension, and the presented approach is backwards compatible. Embodiments of the presented approach may furthermore be implemented without impact on existing standards. For instance, standards for Bluetooth, BLE and WLAN enable to use of different timings of transmissions of packets to support different requirements of different applications.

Figure 2:
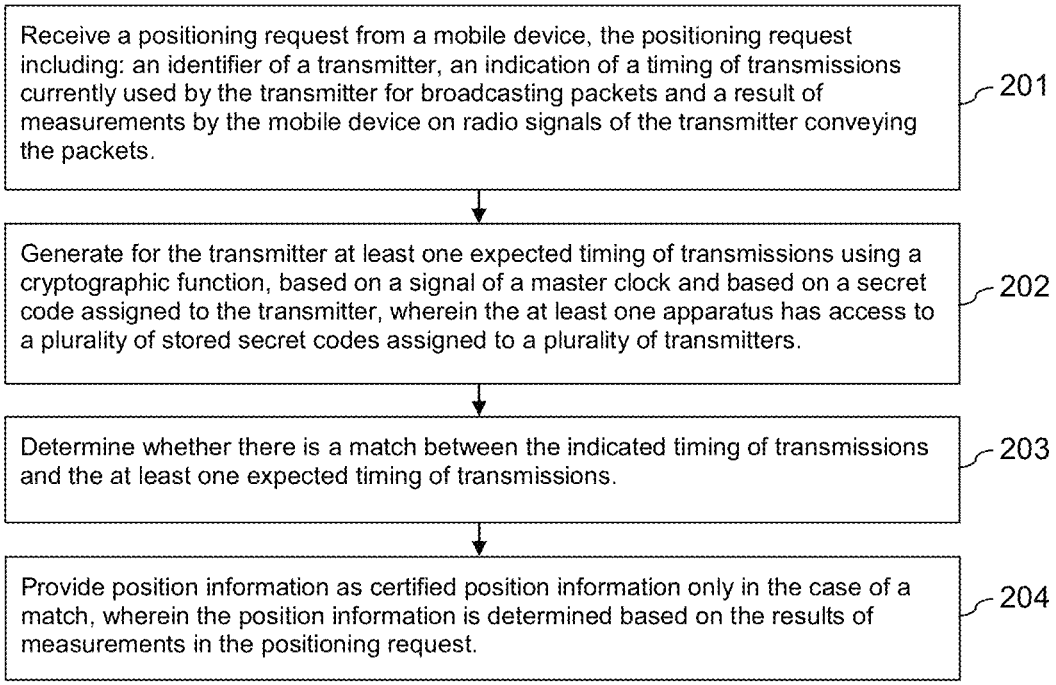
FIG. 2 is a flow chart illustrating an example embodiment of a method according to the first aspect.
Figure 4:
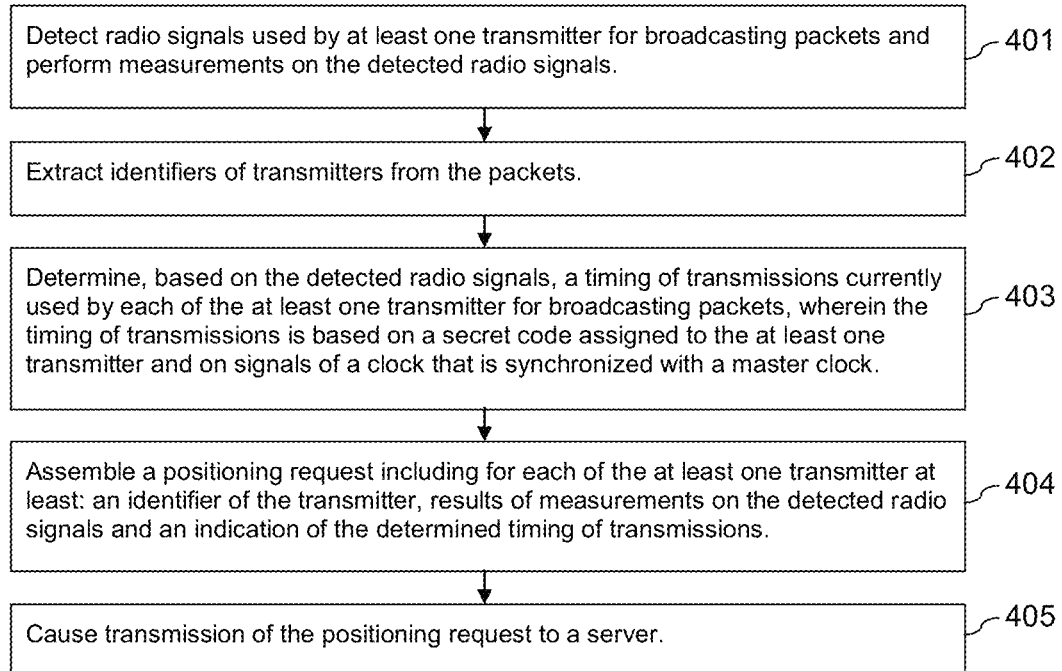
FIG. 4 is a flow chart illustrating an example embodiment of a method according to the second aspect.
Figure 6:
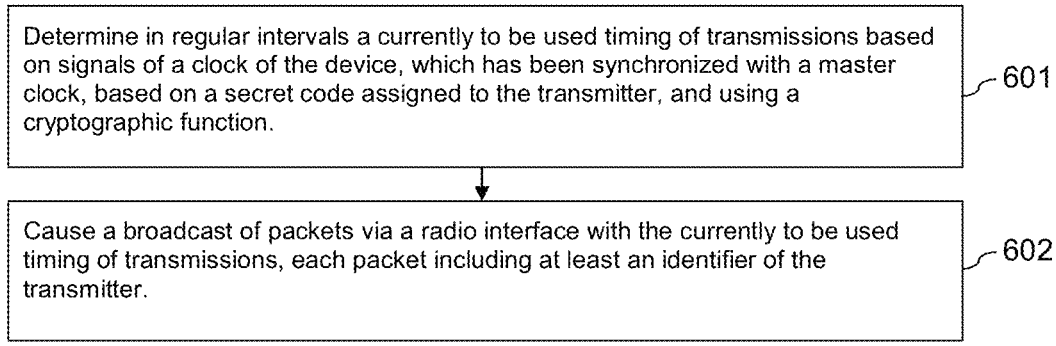
FIG. 6 is a flow chart illustrating an example embodiment of a method according to the third aspect.

System 100 illustrated in FIG. 1 and the method illustrated in FIG. 2, apparatus 300 illustrated in FIG. 3 and the method illustrated in FIG. 4, as well as apparatus 500 illustrated in FIG. 5 and the method illustrated in FIG. 6 may be implemented and refined in various ways.

In certain embodiments of the first aspect, the at least one apparatus further determines whether the transmitter is a registered secure transmitter. The at least one expected timing of transmissions may then be determined only, if the transmitter is a registered secure transmitter. Requiring only a certain number of such secure transmitters may have the effect that existing solutions with a large number of distributed transmitter devices may be enhanced by adding or replacing a smaller number of transmitter devices. Furthermore, new hardware is only needed for a smaller number of transmitter devices in this case. Furthermore, the additional processing load at the at least one apparatus for generating expected timings of transmissions is limited this way.

It may be determined in different ways whether a transmitter is a registered secure transmitter. For example, a registered secure transmitter may be identified by a tag in a radio map database. The radio map database may provide radio signal related data for a plurality of transmitters, the plurality of transmitters comprising tagged registered secure transmitters and other transmitters. This may have the effect of a limited overhead, as a query for a timing of transmissions may only be triggered for relevant transmitters. Alternatively, for example, a registered secure transmitter is a transmitter for which a secure code is stored in a database that is separate from a database with a radio map providing radio signal related data for a plurality of transmitters, the plurality of transmitters comprising registered secure transmitters and other transmitters. A timing of transmissions may then be requested for instance for all transmitters for which results of measurements have been received; and the timing of transmissions is only determined when a secure code for the transmitter is available. This may have the effect that the structure of the radio map does not have to be modified.

It is to be understood that for other embodiments, it may be required that all registered transmitters, for which radio signal related data is available in a database, are required to be secure transmitters.

In certain embodiments of the first and second aspect, the results of measurements on radio signals of the transmitter in the positioning request comprise an indication of a received signal strength at the mobile device. A received signal strength may be indicated for example in the form of an RSSI or as an absolute or relative value in dB. In certain embodiments of the first aspect, results of measurements on radio signals of the transmitter in the positioning request may then only be accepted for determining position information, if the received signal strength indicated for the transmitter exceeds a predetermined signal level. This may have the effect that it can be ensured that a mobile device has to be sufficiently close to a transmitter, for instance that it has to be in the same room as the transmitter. Using an indication of a received signal strength may have the effect that it is suited for any kind of transmitter. It is to be understood, however, that other parameters may be used as well, for instance an indication of a path loss.

In certain embodiments of the first aspect, a positioning request comprising results of measurements for a predetermined transmitter is only accepted, if the positioning request comprises in addition results of measurements for at least one further predetermined transmitter. This may have the effect that information about signals of secure transmitters may not simply be omitted by a mobile device of a malicious user. An indication of possible further predetermined transmitters may be stored for each transmitter for example in a radio map database.

A service provider that intends to provide a certain service only to mobile devices at certain locations may be informed in different ways that a position of a mobile device determined by the at least one apparatus may presumably be trusted.

In certain embodiments of the first aspect, position information may be provided directly to an entity of a service provider, for example to a server of the service provider, by the at least one apparatus. In this case, the service provider may trust the at least one apparatus to provide only position information that is based on verified positioning requests.

In other embodiments of the first aspect, position information may be provided by the at least one apparatus to the requesting mobile device, which may forward the position information for example to a service provider. In this case, additional measures may be taken to ensure that the mobile device provides only trusted position information to the service provider. The at least one apparatus may encrypt the position information; and the service provider may accept encrypted position information only as trusted position information. It is to be understood that the encrypted position information may comprise an indication of a time that may be considered in addition by the service provider to determine the time of validity. Alternatively, the at least one apparatus may digitally sign the position information and provide the resulting digital signature along with the position information to the mobile device for forwarding to a service provider; and the service provider may only accept position information that is accompanied by a valid digital signature as trusted position information. It is to be understood that the position information and/or the digital signature may comprise a time component, and that position information may only accepted as valid for a certain time span after a time indicated by the time component. Further alternatively, the at least one apparatus may generate a position validation token having a unique identifier and a limited lifespan, and provide the token along with the position information to the mobile device for forwarding to a service provider; and the service provider may only accept position information that is accompanied by a valid position validation token as trusted position information.

In case there is no match between at least one expected timing of transmissions and a received indicated timing of transmissions, in certain embodiments of the first aspect the at least one apparatus requests a new positioning request from the mobile device or rejects the positioning request. It may also block the mobile device completely from making use of the positioning service. Alternatively or in addition, it may trigger an alert.

In case more than one expected timing of transmissions is generated, a previous and/or a next expected timing of transmissions may be generated in addition to a current timing of transmissions. If there is no match with the current timing of transmissions, the at least one apparatus may re-evaluate the received indicated timing of transmissions by comparing it with the previous expected timing of transmissions and/or the next timing of transmissions measurements before requesting a new positioning request or before rejecting the positioning request and/or before triggering an alert. This may take account of minor shifts within the clocks of the transmitter device and the master clock and of latencies in the transmission. It is to be understood that in example embodiments, further timings of transmissions may only be generated for example in the case that there is no match of the indicated timing of transmissions with the current timing of transmissions.

In certain embodiments of the second aspect, determining the timing of transmissions currently used by a transmitter for broadcasting packets comprises extracting an indication of a timing of transmissions currently used by a transmitter from a received packet transmitted by the transmitter. This may have the effect that the processing load at the mobile device is limited. WLAN access points operating under IEEE 802.11, for example, may transmit a corresponding value anyhow in the defined beacon frame. Alternatively, the mobile device may measure a time between received packets transmitted by the transmitter. This approach may have the effect that it is usable for any kind of transmitter devices, including those that transmit a reduced set of information compared to WLAN access points.

Figure 7:
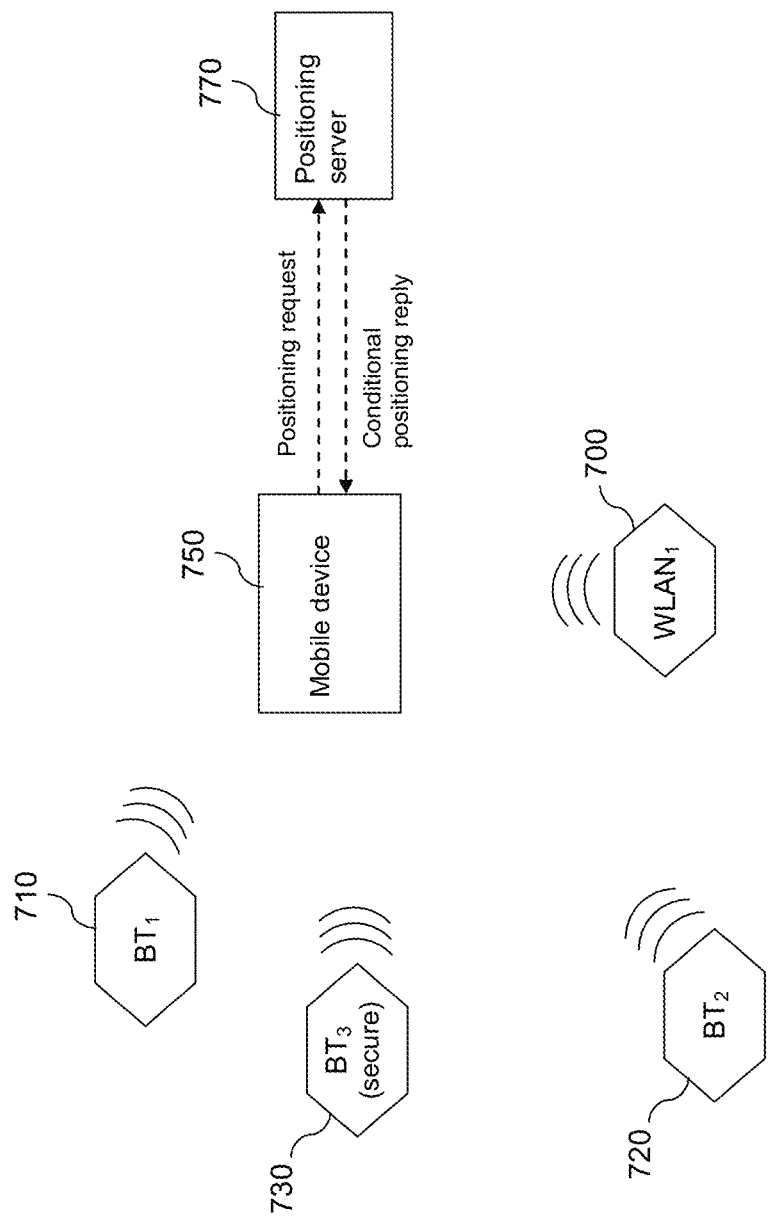
FIG. 7 is a schematic block diagram of an example embodiment of a complete system.

FIG. 7 is a schematic block diagram of an example embodiment of an overall system supporting a secure terrestrial transmitter based positioning of mobile devices at a localization site.

The system comprises several transmitter devices distributed over the localization site, including transmitter devices 700-730. The system further comprises a mobile device 750 and a positioning server 770.

Transmitter devices 700-730 may comprise a conventional WLAN access point 700, conventional Bluetooth devices 710, 720 and a secure Bluetooth device 730. All or some of Bluetooth devices 710-730 may be BLE devices. There may be several secure transmitter devices distributed at the localization site. The secure transmitter devices may all be Bluetooth devices, but they may also include WLAN access points. Transmitter devices 700-730 are assumed to be battery-powered, but they may equally be powered through an external DC source. Each of transmitter devices 700-300 comprises at least one transmitter with associated transmitter ID.

Figure 8:
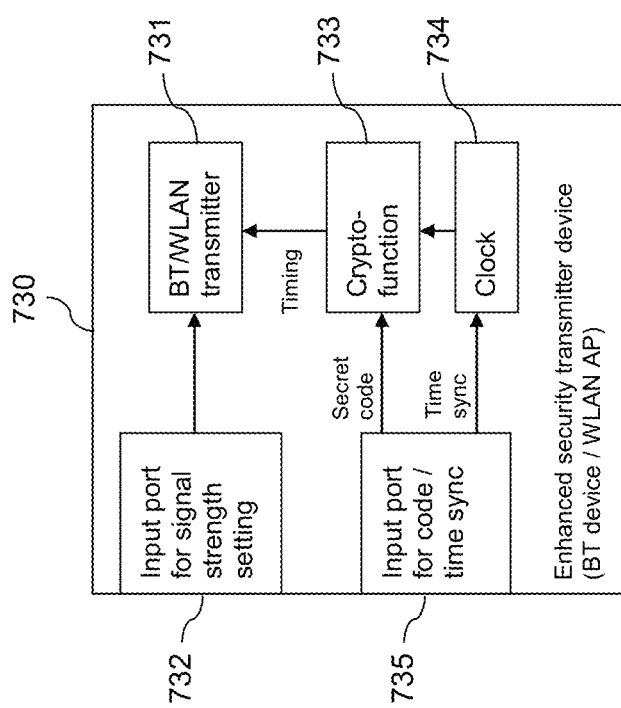
FIG. 8 is a schematic block diagram of an example embodiment of a secure transmitter device in the system of FIG. 7.

FIG. 8 is a schematic block diagram illustrating example details of a secure transmitter device, like secure Bluetooth device 730. Transmitter device 730 comprises a transmitter 731, in the case of secure Bluetooth device 730 a Bluetooth transmitter. Transmitter 731 is connected to an input port for signal strength settings 732. Transmitter 731 is configured to broadcast advertising packets using a predetermined format. In addition, transmitter device 730 comprises a cryptographic function module 733. This module 733 may be implemented in hardware and/or software; it may be for instance a microcontroller. Cryptographic function module 733 is configured to generate timings of transmissions, or cycle times, for transmitter 731 using a cryptographic function. Transmitter device 730 comprises a clock 734 with an output that is linked to an input of cryptographic function module 733. Transmitter device 730 comprises an input port 735 that is linked to an input of cryptographic function module 733 and to a synchronization input of clock 734. Module 733 may correspond to apparatus 500 of FIG. 5, with program code stored in memory 502 designed to cause processor 501 to apply the cryptographic function.

If the secure transmitter devices distributed at the localization site include WLAN access points, they may be implemented in a similar manner, with the main difference (for the presented approach) that transmitter 731 is a WLAN transmitter.

Signals of transmitter devices 700-730 may be detected by mobile device 750 when it is located in a particular room of the localization site.

Mobile device 750 may be any device that is configured to move around and that may need its own position. It may be for instance a smartphone, a smart watch, a tablet PC, an IoT device or any other mobile device. Mobile device 750 may correspond to the apparatus 300 of FIG. 3 and include corresponding components. In this case, radio interfaces 304 may enable receipt of signals transmitted by Bluetooth devices and WLAN access points, and a data communication with positioning server 770 via a radio link that is used for accessing the Internet. User interface 303 may enable a user for instance to initiate a positioning request or an application that automatically generates a positioning request. The application may provide or give access to a service that requires the user to be located at a particular location.

Positioning server 770 is configured to receive positioning requests from mobile devices via the Internet and to provide a position, if the content of the request can be authenticated. It is to be understood that the functions of positioning server 770 may also be performed in the cloud in a distributed manner.

Figure 9:
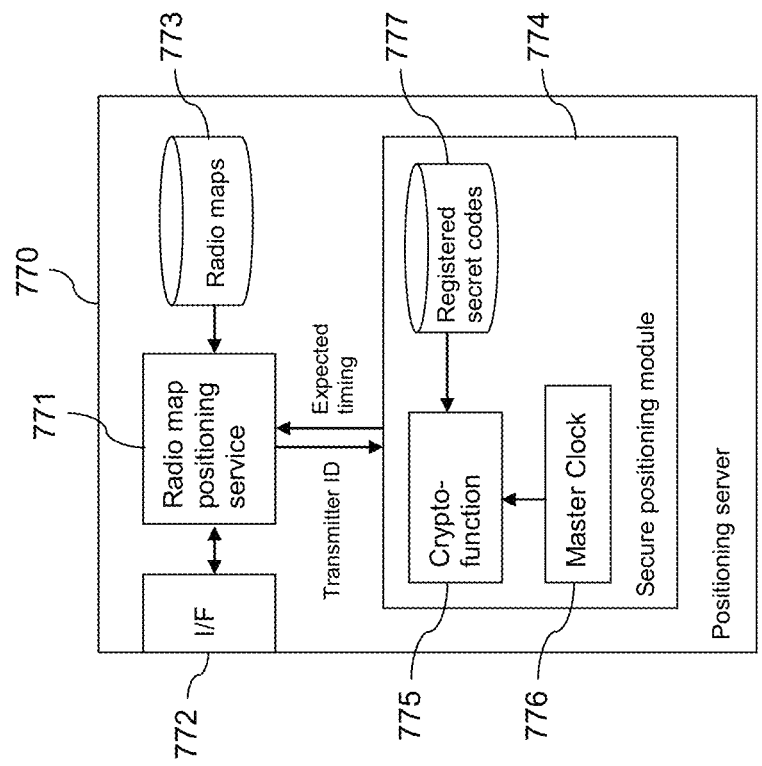
FIG. 9 is a schematic block diagram of an example embodiment of a server device in the system of FIG. 7.

FIG. 9 is a schematic block diagram illustrating example details of positioning server 770. Here, server 770 comprises a radio map positioning service module 771 that is linked to an interface (I/F) 772, a database 773 storing radio maps and a secure positioning module 774.

Each radio map may indicate for instance for a multitude of locations at the localization site, arranged in the form of a grid, which received signal strength of signals broadcast by a particular transmitter device may be expected to be detected at the respective location. Each radio map may be associated by a transmitter ID to a particular transmitter and thus to a particular transmitter device 700-730. In addition, each transmitter device that is registered as a secure transmitter device 730 may be tagged as secure in the associated radio map. To this end, database 773 may provide an additional field for each radio map, which allows identifying a transmitter device as secure. The data for the radio map may have been collected for instance by mobile devices surveying the localization site and providing fingerprints indicating for various locations which transmitter devices can be detected with which signal strength. In addition, it may be indicated for each transmitter device 700-730, which further transmitter devices may be detected if signals for the specific transmitter device are detected.

Secure positioning module 774 comprises a cryptographic function module 775 that is linked to a database 777 storing secret codes and to an output of a master clock 776. Each secret code is associated in database 777 with a transmitter ID, and each transmitter ID identifies a respective registered transmitter and thus the transmitter device 700-730 comprising the transmitter. The data in database 777 may optionally be encrypted to enhance security.

Positioning server 770 may be responsible for a single localization site and store only data for transmitters at this site in databases 773 and 777, or it may be responsible for a plurality of localization sites and store data for transmitters at each of these sites. Databases 773 and 777 are stored in a common or in separate memories.

Positioning server 770 may correspond to system 100 of FIG. 1 and include corresponding components. Positioning service module 771 and cryptographic function module 775 may be for instance a single multi-function module with a single processor 101 executing different program codes stored in a single memory 102; or positioning service module 771 and cryptographic function module 775 may be distinct modules, each comprising an own processor 101 and an own memory 102 storing program code. In both cases, system 100 includes in addition at least interface 772, databases 773 and 777 and master clock 776. Alternatively, cryptographic function module 775 may correspond to system 100 of FIG. 1 and include corresponding components, that is, a memory 102 with program code implementing a cryptographic function and a processor 101 for executing the program code. Further alternatively, secure positioning module 774 may correspond to system 100 of FIG. 1; in this case, system 100 comprises in addition master clock 776 and memory 777. Secure positioning module 774 or cryptographic function module 775 may be for instance a microcontroller.

Figures 10, 11:
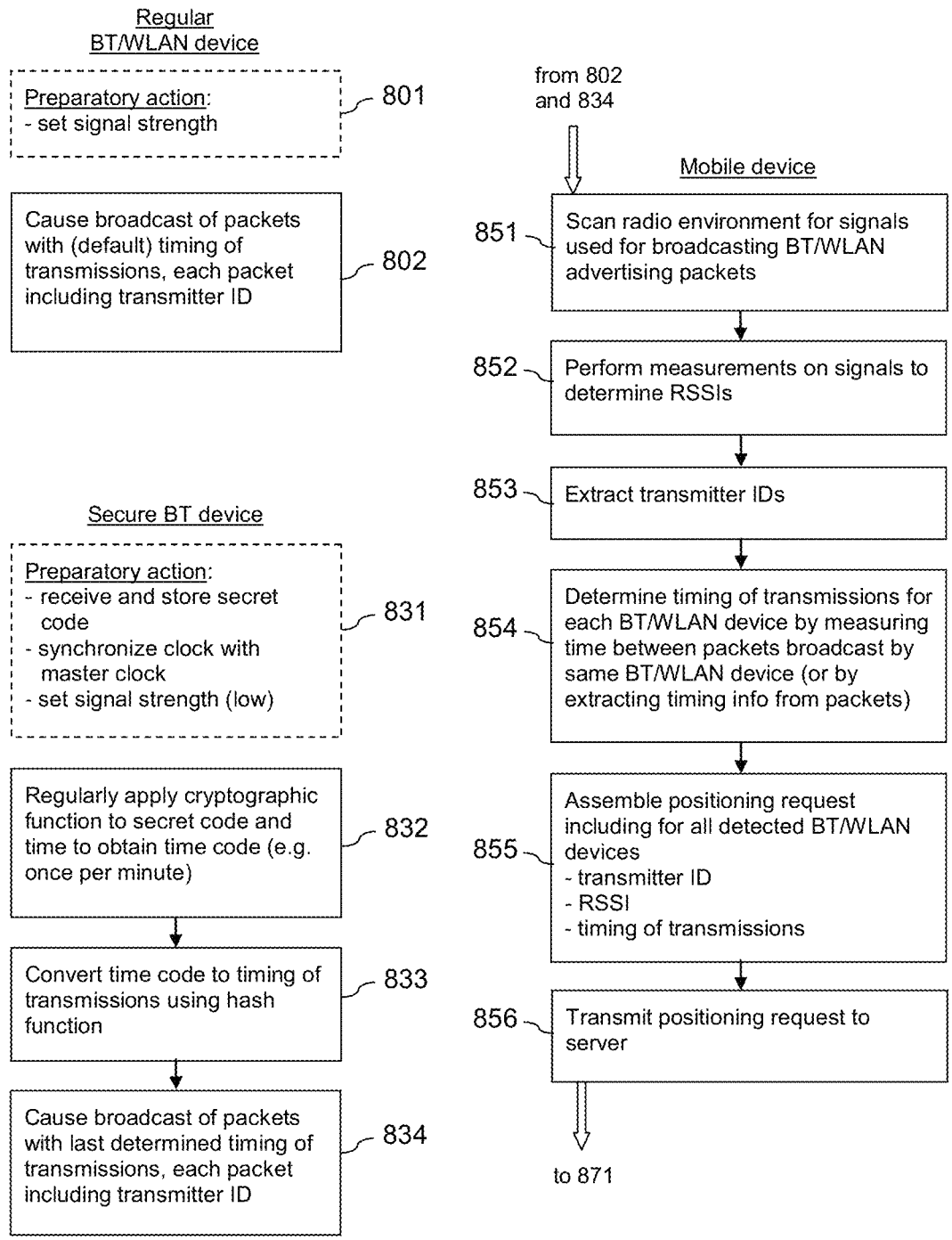
FIG. 10 is a flow chart illustrating an example embodiment of operations in the system of FIG. 7.
FIG. 11 is a continuation of the flow chart of FIG. 10.
Figure 12:
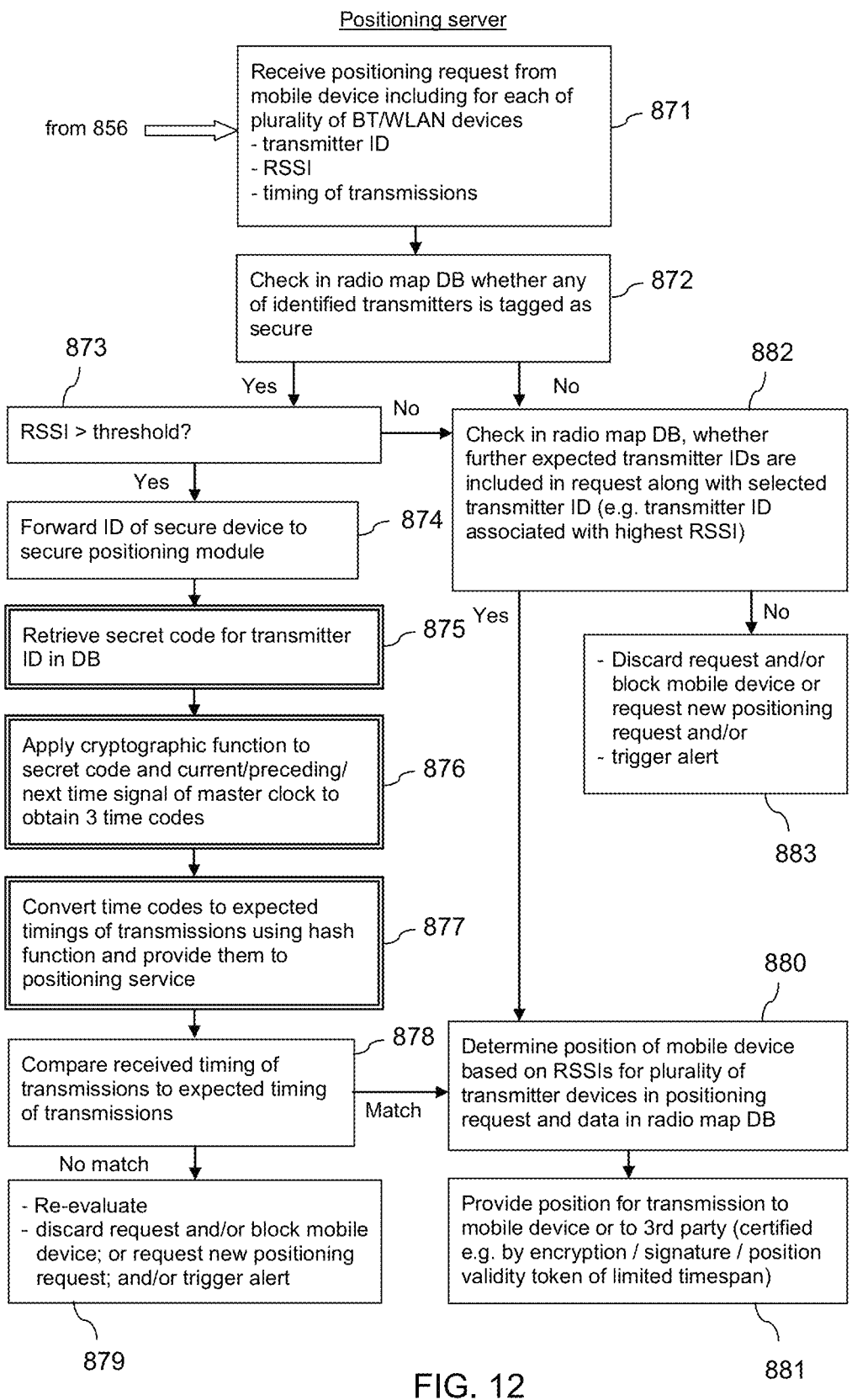
FIG. 12 is a continuation of the flow chart of FIG. 11.

FIGS. 10 to 12 are flow charts illustrating example operations in the system of FIG. 7.

Transmitter devices 700-730 are caused to perform the actions presented in FIG. 10 when corresponding program code is retrieved from at least one memory and executed by at least one processor.

In a preparatory action, regular WLAN access points 700 and regular Bluetooth devices 710, 720 receive a signal strength setting in order to configure their transmitter to transmit advertising packets with a signal strength, which provides a good spatial coverage while saving energy, since at least some of the transmitter devices 700-720 may be batters-powered. The optimum spatial coverage for each device 700-720 may depend on the specific location and the distribution of transmitter devices 700-730 over the localization site. In addition, transmitter devices 700-720 may receive a timing of transmissions as a configurable parameter, which may be set to a value considered suitable for positioning purposes. (action 801) Alternatively, a pre-set default signal strength value and/or a pre-set standard timing of transmissions could be used for at least one of the transmitter devices 700-720.

During operation, transmitter devices 700-720 cause a broadcast of packets in regular transmission intervals using the set signal strength and the set timing of transmissions, each packet including at least a transmitter ID assigned to the transmitter of the respective transmitter device 700-720. (action 802) A transmitter ID may be for instance an SSID in the case of WLAN signals and a Universally Unique Identifier (UUID) in the case of a Bluetooth signal. It may also be any other kind of identifier, like a medium access control (MAC) address.

The content of the packets of WLAN access point 700 may carry for instance the following information as defined in IEEE 802.11 for beacon frames:
Timestamp
Beacon interval, which indicates the time interval between transmissions
Capability information
Service set identifier (SSID)
Supported rates
Frequency-hopping (FH) Parameter Set
Direct-Sequence (DS) Parameter Set
Contention-Free (CF) Parameter Set
Independent basic service set (IBSS) Parameter Set
Traffic indication map (TIM)

The packets transmitted by Bluetooth devices 710, 720 may have a reduced set of information embedded.

In a preparatory action, secure Bluetooth device 730 receives settings via input ports 732 and 735. It receives a signal strength setting via input port 732. Transmitter 731 may be configured with this signal strength setting. It may be set to a reduced value compared to the signal strength setting provided to the transmitters of the regular transmitter devices 700-720 to ensure that it covers a comparatively small area. Secure Bluetooth device 730 receives a secret code assigned to device 730 via one of input ports 735. The secret code is provided to cryptographic function module 733. It may be stored for instance in a working memory of cryptographic function module 733. Secure Bluetooth device 730 furthermore receives a synchronization signal via another one of input ports 735. The synchronization signal is fed to clock 734 in order to synchronize clock 734 with master clock 776 of positioning server 770.

It is to be understood that the synchronization signal does not have to be provided by master clock 776; it could also be provided for instance by another clock that controls master clock 776 as well, or by a further clock that has been synchronized itself by master clock 776. (action 831) The clocks may be synchronized for example using the Network Time Protocol (NTP).

During operation, cryptographic function module 775 of secure Bluetooth device 730 applies a cryptographic function in regular intervals to the stored secret code and the current time signal output by synchronized clock 734 to obtain a time code. (action 832). The time code may be for instance a 6-digit code, but it may be of any other length as well. A new time code may be generated for instance once per minute, but any other time interval may be used as well. Shorter intervals may result in a higher security than longer intervals. The cryptographic function may rely for instance on the same cryptographic algorithm as RSA SecurID®.

In essence, the SecurID mechanism allows for an inexpensive hardware token that periodically generates a 6-digit code, which appears to be completely random. However, the code is generated based on a seed parameter exclusive to the token (corresponding to the secret code received by secure Bluetooth device 730 in action 831) and a time slot component (corresponding to a signal output by synchronized clock 734), which are fed into an advanced encryption standard (AES) based cryptographic function (corresponding to an example function applied by cryptographic function module 733 in action 832) to obtain a currently valid authentication code (corresponding to the time code in action 832). A SecurID server knows the seed parameters of all registered tokens and, utilizing the same time slot component and the same cryptographic function, the server can determine at any time and for all registered tokens the currently valid authentication code.

Cryptographic function module 733 moreover converts the time code to a timing of transmissions—or cycle time—using a trivial hash-function that ensures that the resulting timing always lies within a reasonable range. (action 833) It is to be understood, however, that the timing of transmissions may be derived in different ways from the output of the actual cryptographic function; it may also be derived by using only certain bits of the time code etc.

Secure Bluetooth device 730 causes transmitter 731 to broadcast packets with the determined timing of transmissions, until the next timing of transmissions is generated in actions 832-833. The packets are conveyed by signals with the set reduced signal strength. The packets as such may correspond to the packets that are broadcast by the regular Bluetooth devices 710, 720. Each packet thus comprises at least a transmitter ID. (action 834)

Mobile device 750 is caused to perform the actions presented in FIG. 11 when corresponding program code is retrieved from at least one memory and executed by at least one processor.

Mobile device 750 may need to know its own position at the localization site. This may be required for instance by some application as a precondition to obtain access to some service, which may only be allowed when mobile device 750 is at a particular location in a particular room at the localization site.

Mobile device 750 scans the radio environment for signals of Bluetooth devices and WLAN access points. These may be signals on certain frequency channels that are known to be used by Bluetooth devices and WLAN access points for broadcasting advertising packets. (action 851) In the scenario of FIG. 7, mobile device 750 may be in a room in which it is able to detect signals of each of transmitter devices 700-730.

Mobile device 750 performs measurements on detected signals to determine the received signal strengths and to derive corresponding RSSIs. (action 852)

Mobile device 750 extracts information in advertising packets conveyed by the detected signals, including at least a transmitter ID of the respective transmitter device 700-730. (action 853)

Next, mobile device 750 determines the timing of transmissions for each transmitter device 700-730 of which advertising packets were detected. To this end, it measures the time between packets broadcast by the same transmitter device 700-730. As far as the timing of transmissions is already indicated in the packets of certain transmitter devices (e.g. as beacon interval in a WLAN advertising packet), mobile device 750 may optionally use this indicated value instead of performing own measurements on the signals of these transmitter devices. (action 854)

Mobile device 750 now assembles a positioning request. The positioning request includes for each transmitter device 700-730 of which signals conveying advertising packets were detected the extracted transmitter ID, the determined RSSI and an indication of the measured or extracted timing of transmissions. (action 855)

Finally, mobile device 750 transmits the assembled positioning request to positioning server 770. (action 856)

Positioning server 770 is caused to perform the actions presented in FIG. 12 when corresponding program code is retrieved from at least one memory and executed by at least one processor. All actions represented in FIG. 12 by blocks with single lines are caused by program code belonging to radio map positioning service module 771, and all actions represented in FIG. 12 by blocks with double lines are caused by program code belonging to cryptographic function module 775.

Positioning server 770 receives the positioning request from mobile device 750, including for several transmitter devices 700-730 a transmitter ID, an RSSI and an indication of a timing of transmissions. (action 871)

Positioning server 770 checks database 773 to determine whether any of the identified transmitter devices 700-730 is tagged as secure in the associated radio map data. (action 872)

In the present example, Bluetooth device 730 is tagged as secure in database 773.

Positioning server 770 then checks whether the RSSI for the secure transmitter device(s) exceeds a threshold value. (action 873) This may ensure that mobile device 750 can be assumed to be sufficiently close to a secure transmitter device, for instance in the same room, and that it is no attacker trying to spoof from an adjacent room, for instance. It is to be understood that, depending on the implementation, the expression "exceeds" may also cover the requirement "is equal to or exceeds".

If the threshold value is exceeded, positioning server 770 internally forwards the transmitter ID of one or more secure transmitter devices in the positioning request to secure positioning module 774. (action 874) It is to be understood that, for example, only the transmitter ID with the highest associated RSSI may be provided to secure positioning module 774, or the transmitter IDs of all secure transmitter devices, or the transmitter IDs of all secure transmitter devices with an associated RSSI exceeding the threshold value.

In secure positioning module 774, cryptographic function module 775 retrieves the secret code for all received transmitter IDs from database 777. (action 875) If the data in database 777 is encrypted, cryptographic function module 775 is configured to decrypt the data to obtain the secret codes.

For each received transmitter ID, cryptographic function module 775 applies the implemented cryptographic function to the associated, retrieved secure code and a current time instant, furthermore to the secure code and a preceding time instant, and furthermore to the secure code and a next time instant, in order to obtain three time codes. (action 876) The time instants have the same intervals as the intervals used by cryptographic function module 733 for obtaining time codes. The time instants are triggered by signals of master clock 776, which is synchronized with clock 734. Cryptographic function module 775 also uses the same cryptographic algorithm as cryptographic function 733.

Cryptographic function module 775 moreover converts each time code to an expected timing of transmissions by applying a hash function to the time code. The resulting preceding, current and next expected timings of transmissions for each transmitter ID are provided as a feedback to positioning service module 771. (action 877) Cryptographic function module 775 uses the same hash function as cryptographic function module 733.

Positioning server 770 compares the current expected timing of transmissions to the timing of transmissions indicated in the positioning request for each relevant transmitter ID. (action 878) Relevant transmitter IDs may be those that have been provided to secure positioning module 774 in action 874.

If there is no match for at least one relevant transmitter ID, positioning server 770 may at first perform some re-evaluations. Positioning server 770 may compare the timing of transmissions indicated in the positioning request and associated with the transmitter ID to the preceding timing of transmissions determined for the transmitter ID, and if there is still no match, it may compare the timing of transmissions indicated in the positioning request to the next timing of transmissions. (actions 879, 878)

Finally, if no match is found for at least one relevant transmitter ID, the positioning request may be discarded or mobile device 750 may be blocked completely from access to the positioning service. Alternatively, a new positioning request may be requested from mobile device 750. In each of these cases, an alert may optionally be triggered in addition. (action 879)

If there is a match in action 878 for all relevant transmitter IDs, it can be assumed to be very likely that mobile device 750 is in the vicinity of the identified secure transmitter device(s) 730. Positioning server 770 thus determines a position of mobile device 750 based on the RSSIs for a plurality of transmitter devices 700-730 identified in the positioning request and on radio map data for the concerned transmitter devices 700-730 in radio map database 773. (action 880) The position may be determined in the form of coordinates. Optionally, only RSSIs exceeding a certain threshold value may be considered in the position computations. In some embodiments, a position may only be determined, if the number of transmitter devices, for which measurement results are provided and that are not excluded for some reason, like a too low associated RSSI, is at least equal to a predetermined number.

Positioning server 770 provides the determined coordinates to mobile device 750 along with a current time or a time of measurements and any other desired associated data. (action 881)

The position and any associated data may be encrypted so that it may only be decrypted and used by a particular application running on mobile device 750 that requested the position, or by a third party that offers a location dependent service and to which the encrypted position has to be forwarded by mobile device 750 before the service is provided.

Alternatively, a third-party server may have registered in advance with positioning server 770, and the servers may exchange keys. For instance, the third-party server may obtain a public key that is associated with a private key of positioning server 770. When mobile device 750 sends a positioning request to server 770 in action 871 and positioning server 770 determines a position of mobile device 750 in action 880, positioning server 770 may then compute in addition a signature for the position and associated data based on its private key and provide the signature along with the position and associated data to mobile device 750. Mobile device 750 receives the position and the signature and forwards both to the third-party server, which may verify the signature using the public key of positioning server 770. As a result, the third-party server knows the position of mobile device 750 and has obtained secure information indicating that the position was not spoofed in the opinion of positioning server 770. In addition, it knows that the position is a recent position, if the associated data comprises an indication of a recent time. A position that is not accompanied by a valid signature may generally not be accepted by the third-party server.

Further alternatively, positioning server 770 may issue a position validation token, which certifies that mobile device 750 is at the determined position at a specific time. Such a token may have a unique identifier and also have a short lifespan, in accordance with the required security at the location. The token can be sent by positioning server 770 to mobile device 750 along with the position, and mobile device 750 may be required to forward both to a third-party server to enable the third-party server to determine whether mobile device 750 is entitled to a particular location dependent service.

Further alternatively, the positioning request could also cause positioning server 770 to transmit the position directly to a third party service provider offering some location dependent service. It is to be understood that also in this case, positioning server 770 may optionally encrypt the position before transmission and/or determine and provide a signature and/or determine and provide a position validation token along with position and associated data.

In general, any measure may be taken to securely indicate to some entity that mobile device 750 is considered to be truly located at an indicated position at a current time.

If it is determined in action 872 that none of the transmitter devices identified in the positioning request is tagged in database 773 to be secure, or if none of the RSSIs associated with a transmitter device identified in the positioning request that is tagged in database 773 to be secure is determined to exceed the threshold value in action 873, it is determined in addition whether there may be a legitimate reason for this. To this end, it is checked in database 773 for instance for the transmitter ID with the highest associated RSSI, which other transmitter IDs may possibly be included in parallel in a positioning request. (action 882)

If there is for example a certain number of coinciding transmitter IDs included in the positioning request and expected to be possibly included, positioning server 770 may assume that there is a legitimate reason that no data for a secure transmitter device is included in the positioning request. Positioning server 770 may thus continue with actions 880 and 881 to determine and provide the position of mobile device 750.

In contrast, if there is not a certain number of coinciding transmitter IDs included in the positioning request and expected to be possibly included, positioning server 770 assumes that mobile device 750 is not entitled to request its position based on the data included in the positioning request. In this case, there may be assumed to be a risk that a malicious user of mobile device 750 has detected, which transmitter devices are secure transmitter devices, and causes mobile device 750 to include only measurement results for other transmitter devices in the positioning request. In this case, positioning server 770 may discard the positioning request, block mobile device 750 completely or request a new positioning request from mobile device 750. Alternatively or in addition, it may trigger an alert. (action 883)

It is to be understood that the presented example systems, apparatuses and operations may be varied in many ways. The systems and apparatuses may be varied for instance by modifying, adding or omitting components. The operations may be varied for instance by modifying actions, by omitting actions and/or by adding actions. In addition, the order of actions may be modified and/or some of the actions may be carried out in parallel.

In an example variation, instead of having secure transmitter devices tagged in radio map database 773 and forwarding only the identifiers of secure transmitter devices to secure positioning module 774, it would be possible to forward all identifiers to secure positioning module 774 and to let secure positioning module 774 determine based on the entries in database 777 which transmitter device is a registered secure transmitter device. If the transmitter device is not registered in database 777, a void reply may be issued for the associated transmitter ID to radio map positioning service 771.

In another example variation, all transmitter devices may be required to be implemented as secure transmitter devices and to be registered in database 777. This may lead to a further enhanced security. Actions 872 and 882 of FIG. 12 could be omitted in this case. Data for transmitter devices that are not registered may simply be ignored.

In another example variation, other parameters than the timing of transmissions could be altered as well based on time and/or a secure code to further increase security of the system. In some example embodiments, also the signal strength could be varied.

Summarized, certain embodiments may allow leveraging timing parameters for the broadcast of packets, which—as such—are defined e.g. in Bluetooth and WLAN specifications, by basing the timing on a current time and a secret code only known to a positioning server and a transmitter device. If a transmitter device changes the timing of transmissions in a manner that appears completely random, but is predictable only to the positioning server, a mobile device that is to be positioned based on detected packets can be required to provide timing information related to the transmitter device. Only if the mobile device is at the correct physical location at the right time, it will be able to pick up the correct timing information, thus authenticating the signal availability and strength readings.

The following embodiments are also disclosed:

Embodiment 1

A method comprising, performed by at least one apparatus:
  receiving a positioning request from a mobile device, the positioning request including: an identifier of a transmitter, an indication of a timing of transmissions currently used by the transmitter for broadcasting packets and a result of measurements by the mobile device on radio signals of the transmitter conveying the packets;
  generating for the transmitter at least one expected timing of transmissions using a cryptographic function, based on a signal of a master clock and based on a secret code assigned to the transmitter, wherein the at least one apparatus has access to a plurality of stored secret codes assigned to a plurality of transmitters;
  determining whether there is a match between the indicated timing of transmissions and the at least one expected timing of transmissions; and
  providing position information as trusted position information only in the case of a match, wherein the position information is determined based on the results of measurements in the positioning request.

Embodiment 2

The method according to embodiment 1, further comprising determining whether the transmitter is a registered secure transmitter, wherein the at least one expected timing of transmissions is determined:
  only if the transmitter is a registered secure transmitters; or
  only if the transmitter is a registered secure transmitter that is identified by a tag in a radio map database, the radio map database providing radio signal related data for a plurality of transmitters, the plurality of transmitters comprising tagged registered secure transmitters and other transmitters; or
  only if the transmitter is a registered secure transmitter, wherein a registered secure transmitters is a transmitter for which a secure code is stored in a database that is separate from a radio map database providing radio signal related data for a plurality of transmitters, the plurality of transmitters comprising registered secure transmitters and other transmitters.

Embodiment 3

The method according to embodiment 1 or 2, wherein the results of measurements on radio signals of the transmitter in the positioning request comprise an indication of a received signal strength at the mobile device, and wherein results of measurements on radio signals of the transmitter in the positioning request are only accepted for determining position information, if the received signal strength indicated for the transmitter exceeds a predetermined signal level.

Embodiment 4

The method according to one of embodiments 1 to 3, wherein a positioning request comprising results of measurements for a predetermined transmitter is only accepted, if the positioning request comprises in addition results of measurements for at least one further predetermined transmitter.

Embodiment 5

The method according to one of embodiments 1 to 4, wherein providing position information comprises:
  providing the position information to an entity of a service provider; and/or
  providing the position information in encrypted form; and/or
  providing the position information along with a digital signature; and/or
  providing the position information along with a validation token, the validation token having a unique identifier and a limited lifespan.

Embodiment 6

The method according to one of embodiments 1 to 5, further comprising, in case there is no match, at least one of:
  re-evaluating the indicated timing of transmissions; or
  requesting a new positioning request from the mobile device; or
  rejecting the positioning request;
  blocking the mobile device; or
  triggering an alert.

Embodiment 7

A system comprising at least one apparatus, the at least one apparatus comprising means for causing performance of the actions of the method of any one of embodiments 1 to 6.

Embodiment 8

The system according to embodiment 7, wherein the system is:
  a module for a computer; or
  a computer; or
  a combination of a plurality of computers.

Embodiment 9

A system comprising at least one processor and at least one memory, wherein the at least one memory includes computer program code, the at least one memory and the computer program code configured to, with the at least one processor, cause at least one apparatus at least to:
  receive a positioning request from a mobile device, the positioning request including: an identifier of a transmitter, an indication of a timing of transmissions currently used by the transmitter for broadcasting packets and a result of measurements by the mobile device on radio signals of the transmitter conveying the packets;
  generate for the transmitter at least one expected timing of transmissions using a cryptographic function, based on a signal of a master clock and based on a secret code assigned to the transmitter, wherein the at least one apparatus has access to a plurality of stored secret codes assigned to a plurality of transmitters;
  determine whether there is a match between the indicated timing of transmissions and the at least one expected timing of transmissions; and
  provide position information as trusted position information only in the case of a match, wherein the position information is determined based on the results of measurements in the positioning request.

Embodiment 10

The system according to embodiment 9, wherein the at least one memory and the computer program code are further configured to, with the at least one processor, cause the at least one apparatus to determining whether the transmitter is a registered secure transmitter, and wherein the at least one expected timing of transmissions is determined:
only if the transmitter is a registered secure transmitters; or
only if the transmitter is a registered secure transmitter that is identified by a tag in a radio map database, the radio map database providing radio signal related data for a plurality of transmitters, the plurality of transmitters comprising tagged registered secure transmitters and other transmitters; or
only if the transmitter is a registered secure transmitter, wherein a registered secure transmitters is a transmitter for which a secure code is stored in a database that is separate from a radio map database providing radio signal related data for a plurality of transmitters, the plurality of transmitters comprising registered secure transmitters and other transmitters.

Embodiment 11

The system according to embodiment 9 or 10, wherein the results of measurements on radio signals of the transmitter in the positioning request comprise an indication of a received signal strength at the mobile device, and wherein results of measurements on radio signals of the transmitter in the positioning request are only accepted for determining position information, if the received signal strength indicated for the transmitter exceeds a predetermined signal level.

Embodiment 12

The system according to one of embodiments 9 to 11, wherein a positioning request comprising results of measurements for a predetermined transmitter is only accepted, if the positioning request comprises in addition results of measurements for at least one further predetermined transmitter.

Embodiment 13

The system according to one of embodiments 9 to 12, wherein providing position information comprises:
providing the position information to an entity of a service provider; and/or
providing the position information in encrypted form; and/or
providing the position information along with a digital signature; and/or
providing the position information along with a validation token, the validation token having a unique identifier and a limited lifespan.

Embodiment 14

The system according to one of embodiments 9 to 13, wherein the at least one memory and the computer program code are further configured to, with the at least one processor, cause the at least one apparatus to, in case there is no match, at least one of:
re-evaluate the indicated timing of transmissions; or
request a new positioning request from the mobile device; or
reject the positioning request;
block the mobile device; or
trigger an alert.

Embodiment 15

The system according to any of embodiments 9 to 14, wherein the system is:
a module for a computer; or
a computer; or
a combination of a plurality of computers.

Embodiment 16

A computer program code, which is configured to causes at least one apparatus to perform the actions of the methods of any one of embodiments 1 to 6 when executed by at least one processor.

Embodiment 17

A computer readable storage medium in which computer program code is stored, the computer program code causing at least one apparatus to perform the following when executed by at least one processor:
receive a positioning request from a mobile device, the positioning request including: an identifier of a transmitter, an indication of a timing of transmissions currently used by the transmitter for broadcasting packets and a result of measurements by the mobile device on radio signals of the transmitter conveying the packets;
generate for the transmitter at least one expected timing of transmissions using a cryptographic function, based on a signal of a master clock and based on a secret code assigned to the transmitter, wherein the at least one apparatus has access to a plurality of stored secret codes assigned to a plurality of transmitters;
determine whether there is a match between the indicated timing of transmissions and the at least one expected timing of transmissions; and
provide position information as trusted position information only in the case of a match, wherein the position information is determined based on the results of measurements in the positioning request.

Embodiment 18

A method comprising, performed by a mobile device:
detecting radio signals used by at least one transmitter for broadcasting packets and performing measurements on the detected radio signals;
extracting identifiers of transmitters from the packets;
determining, based on the detected radio signals, a timing of transmissions currently used by each of the at least one transmitter for broadcasting packets, wherein the timing of transmissions is based on a secret code assigned to the at least one transmitter and on signals of a clock that is synchronized with a master clock;
assembling a positioning request including for each of the at least one transmitter at least: an identifier of the transmitter, results of measurements on the detected radio signals and an indication of the determined timing of transmissions; and causing transmission of the positioning request to a server.

Embodiment 19

The method according to embodiment 18, wherein determining the timing of transmissions currently used by a transmitter for broadcasting packets comprises one of:
extracting an indication of a timing of transmissions currently used by a transmitter from a received packet transmitted by the transmitter; or
measuring a time between received packets transmitted by the transmitter.

Embodiment 20

An apparatus comprising means for causing performance of the actions of the method of embodiment 18 or 19.

Embodiment 21

The apparatus according to embodiment 20, wherein the apparatus is:
a mobile device; or
a module for a mobile device.

Embodiment 22

An apparatus comprising at least one processor and at least one memory, wherein the at least one memory includes computer program code, the at least one memory and the computer program code configured to, with the at least one processor, cause a mobile device at least to:
detect radio signals used by at least one transmitter for broadcasting packets and performing measurements on the detected radio signals;
extract identifiers of transmitters from the packets;
determine, based on the detected radio signals, a timing of transmissions currently used by each of the at least one transmitter for broadcasting packets, wherein the timing of transmissions is based on a secret code assigned to the at least one transmitter and on signals of a clock that is synchronized with a master clock;
assemble a positioning request including for each of the at least one transmitter at least: an identifier of the transmitter, results of measurements on the detected radio signals and an indication of the determined timing of transmissions; and
cause transmission of the positioning request to a server.

Embodiment 23

The apparatus according to embodiment 22, wherein determining the timing of transmissions currently used by a transmitter for broadcasting packets comprises one of:
extracting an indication of a timing of transmissions currently used by a transmitter from a received packet transmitted by the transmitter; or
measuring a time between received packets transmitted by the transmitter.

Embodiment 24

The apparatus according to embodiment 22 or 23, wherein the apparatus is:
a mobile device; or
a module for a mobile device.

Embodiment 25

A computer program code, which is configured to cause a mobile device to perform the actions of the method of embodiment 18 or 19 when executed by at least one processor.

Embodiment 26

A computer readable storage medium in which computer program code is stored, the computer program code causing at least one mobile device to perform the following when executed by at least one processor:
detect radio signals used by at least one transmitter for broadcasting packets and performing measurements on the detected radio signals;
extract identifiers of transmitters from the packets;
determine, based on the detected radio signals, a timing of transmissions currently used by each of the at least one transmitter for broadcasting packets, wherein the timing of transmissions is based on a secret code assigned to the at least one transmitter and on signals of a clock that is synchronized with a master clock;
assemble a positioning request including for each of the at least one transmitter at least: an identifier of the transmitter, results of measurements on the detected radio signals and an indication of the determined timing of transmissions; and
cause transmission of the positioning request to a server.

Embodiment 27

A method comprising, performed by a device comprising a transmitter:
determining in regular intervals a currently to be used timing of transmissions based on signals of a clock of the device, which has been synchronized with a master clock, based on a secret code assigned to the transmitter, and using a cryptographic function; and
causing a broadcast of packets via a radio interface with the currently to be used timing of transmissions, each packet including at least an identifier of the transmitter.

Embodiment 28

An apparatus comprising means for causing performance of the actions of the method of embodiment 27.

Embodiment 29

The apparatus according to embodiment 28, wherein the apparatus is:
a module for a transmitter device;
a transmitter device;
a Bluetooth device; and/or
a Bluetooth Low Energy device; or
a wireless local area network access point.

Embodiment 30

An apparatus comprising at least one processor and at least one memory, wherein the at least one memory includes computer program code, the at least one memory and the computer program code configured to, with the at least one processor, cause a device comprising a transmitter at least to:
  determine in regular intervals a currently to be used timing of transmissions based on signals of a clock of the device, which has been synchronized with a master clock, based on a secret code assigned to the transmitter, and using a cryptographic function; and
  cause a broadcast of packets via a radio interface with the currently to be used timing of transmissions, each packet including at least an identifier of the transmitter.

Embodiment 31

The apparatus according to embodiment 30, wherein the apparatus is:
  a module for a transmitter device;
  a transmitter device;
  a Bluetooth device; and/or
  a Bluetooth Low Energy device; or
  a wireless local area network access point.

Embodiment 32

A computer program code, which is configured to causes at least one device comprising a transmitter to perform the actions of the method of embodiment 27 when executed by at least one processor.

Embodiment 33

A computer readable storage medium in which computer program code is stored, the computer program code causing at least one device comprising a transmitter to perform the following when executed by at least one processor:
  determine in regular intervals a currently to be used timing of transmissions based on signals of a clock of the device, which has been synchronized with a master clock, based on a secret code assigned to the transmitter, and using a cryptographic function; and
  cause a broadcast of packets via a radio interface with the currently to be used timing of transmissions, each packet including at least an identifier of the transmitter.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
  (a) hardware-only circuit implementations (such as implementations in only analog and/or digital circuitry)
  (b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
  (c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory (ROM), a random access memory (RAM), a flash memory or a hard disc drive memory etc.

A bus may be provided for connecting processor(s) and memories.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

In example embodiments, any non-transitory computer readable medium mentioned in this text could also be a removable/portable storage or a part of a removable/portable storage instead of an integrated storage. Example embodiments of such a removable storage comprise a magnetic disc storage, of an optical disc storage, a semiconductor memory circuit device storage and of a Micro-SD semiconductor memory card storage.

The functions illustrated by processor 101 in combination with memory 102 can also be viewed as means for receiving a positioning request from a mobile device, the positioning request including: an identifier of a transmitter, an indication of a timing of transmissions currently used by the transmitter for broadcasting packets and a result of measurements by the mobile device on radio signals of the transmitter conveying the packets; means for generating for the transmitter at least one expected timing of transmissions using a cryptographic function, based on a signal of a master clock and based on a secret code assigned to the transmitter, wherein at least one apparatus has access to a plurality of stored secret codes assigned to a plurality of transmitters; means for determining whether there is a match between the indicated timing of transmissions and the at least one expected timing of transmissions; and means for providing position information as trusted position information only in the case of a match, wherein the position information is determined based on the results of measurements in the positioning request.

The program code in memory 102 can also be viewed as comprising such means in the form of functional modules.

The functions illustrated by processor 301 in combination with memory 302, can also be viewed as means for detecting radio signals used by at least one transmitter for broadcasting packets and performing measurements on the detected radio signals; means for extracting identifiers of transmitters from the packets; means for determining, based on the detected radio signals, a timing of transmissions currently used by each of the at least one transmitter for broadcasting packets, wherein the timing of transmissions is based on a secret code assigned to the at least one transmitter and on signals of a clock that is synchronized with a master clock; and means for assembling a positioning request including for each of the at least one transmitter at least: an identifier of the transmitter, results of measurements on the detected radio signals and an indication of the determined timing of transmissions; and means for causing transmission of the positioning request to a server.

The program codes in memory 302 can also be viewed as comprising such means in the form of functional modules.

The functions illustrated by processor 501 in combination with memory 502, can also be viewed as means for determining in regular intervals a currently to be used timing of transmissions based on signals of a clock of device comprising a transmitter, which has been synchronized with a master clock, based on a secret code assigned to the transmitter, and using a cryptographic function; and means for causing a broadcast of packets via a radio interface with the currently to be used timing of transmissions, each packet including at least an identifier of the transmitter.

The program codes in memory 502 can also be viewed as comprising such means in the form of functional modules.

FIGS. 2, 4, 6 and 10 to 12 may also be understood to represent example functional blocks of computer program codes supporting a secure terrestrial transmitter based positioning of mobile devices.

It will be understood that all presented embodiments are only examples, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category may also be used in a corresponding manner in an example embodiment of any other category.

We claim:

1. A method performed by a mobile device, the method comprising:
   detecting at least one radio signal from at least one transmitter for broadcasting at least one packet;
   performing one or more measurements on the detected at least one radio signal;
   extracting an identifier, for the at least one transmitter, from the at least one packet;
   determining, based on the detected at least one radio signal, a transmission timing used by the at least one transmitter for broadcasting the at least one packet, wherein the transmission timing is based on a code assigned to the at least one transmitter and based on at least one signal of a clock; and
   assembling a positioning request including the identifier of the at least one transmitter, a result of the one or more measurements on the detected at least one radio signal and an indication of the determined transmission timing.

2. The method according to claim 1, wherein determining the transmission timing used by the at least one transmitter for broadcasting at least one packet comprises:
   extracting the indication of the transmission timing currently used by the at least one transmitter from the at least one packet transmitted by the at least one transmitter.

3. The method according to claim 1, wherein the at least one packet includes a plurality of received packets, and wherein determining the transmission timing used by the at least one transmitter for broadcasting the at least one packet comprises:
   measuring a time between the plurality of received packets transmitted by the at least one transmitter.

4. The method according to claim 1, wherein the code is an input to a cryptographic function.

5. The method according to claim 4, wherein the at least one signal of the clock is an input to the cryptographic function.

6. The method according to claim 4, wherein the cryptographic function outputs at least one time code.

7. The method according to claim 6, wherein the at least one time code authenticates the at least one transmitter.

8. The method according to claim 6, wherein the at least one time code is converted to the transmission timing.

9. The method according to claim 8, wherein a hash function converts the at least one time code to the transmission timing.

10. The method according to claim 1, further comprising:
    causing transmission of the positioning request to a server.

11. An apparatus comprising at least one processor and at least one memory, wherein the at least one memory includes computer program code, the computer program code being executable by the at least one processor to cause a mobile device to perform operations comprising:
    detecting at least one radio signal from at least one transmitter for broadcasting at least one packet;
    performing one or more measurements on the detected at least one radio signal;
    extracting an identifier for the at least one transmitter from the at least one packet;
    determining, based on the detected at least one radio signal, a transmission timing used by the at least one transmitter for broadcasting the at least one packet, wherein the transmission timing is based on a code assigned to the at least one transmitter and on at least one signal of a clock; and
    assembling a positioning request including the identifier of the at least one transmitter, a result of the one or more measurements on the detected at least one radio signal and an indication of the determined transmission timing.

12. The apparatus according to claim 11, wherein determining the transmission timing used by the at least one transmitter for broadcasting at least one packet comprises:
    extracting the indication of the transmission timing currently used by the at least one transmitter from the at least one packet transmitted by the at least one transmitter.

13. The apparatus according to claim 11, wherein the at least one packet includes a plurality of received packets, and wherein determining the transmission timing used by the at least one transmitter for broadcasting the at least one packet comprises:
    measuring a time between the plurality of received packets transmitted by the at least one transmitter.

14. The apparatus according to claim 11, wherein the apparatus is:
    a mobile device; or
    a module for a mobile device.

15. The apparatus according to claim 11 wherein the code is a first input to a cryptographic function and the at least one signal of the clock is a second input to the cryptographic function.

16. The apparatus according to claim 15, wherein the cryptographic function outputs at least one time code.

17. The apparatus according to claim 16, wherein the at least one time code authenticates the at least one transmitter.

18. The apparatus according to claim 16, wherein the operations further comprise:
sending the positioning request to a positioning server.

19. A method comprising:
detecting at least one radio signal from at least one transmitter;
performing one or more measurements on the detected at least one radio signal;
determining, based on the detected at least one radio signal, a transmission timing used by the at least one transmitter, wherein the transmission timing is based on a code assigned to the at least one transmitter and based on at least one clock signal; and
generating a positioning request including the determined transmission timing and a result of the one or more measurements on the detected at least one radio signal.

* * * * *